United States Patent
Pieper et al.

(10) Patent No.: US 8,983,767 B2
(45) Date of Patent: Mar. 17, 2015

(54) COMPUTER-IMPLEMENTED METHOD AND SYSTEM FOR GENERATING SWATH COVERAGE PATTERNS FOR POLYGONAL AND PSEUDO-POLYGONAL SHAPED FIELDS

(71) Applicant: Jaybridge Robotics, Inc., Cambridge, MA (US)

(72) Inventors: Joshua J. Pieper, Somerville, MA (US); Jeremy W. Nimmer, Acton, MA (US)

(73) Assignee: Jaybridge Robotics, Inc., Cambridge, MA (US)

( * ) Notice: Subject to any disclaimer, the term of this patent is extended or adjusted under 35 U.S.C. 154(b) by 0 days.

(21) Appl. No.: 13/784,246

(22) Filed: Mar. 4, 2013

(65) Prior Publication Data

US 2014/0081568 A1   Mar. 20, 2014

Related U.S. Application Data

(60) Provisional application No. 61/605,849, filed on Mar. 2, 2012.

(51) Int. Cl.
| | | |
|---|---|---|
| *G05D 1/02* | (2006.01) | |
| *G01C 21/00* | (2006.01) | |
| *G01C 21/36* | (2006.01) | |

(52) U.S. Cl.
CPC ........................................ *G01C 21/00* (2013.01)
USPC .............................................. 701/400; 701/50

(58) Field of Classification Search
CPC ... G05D 1/0212; G05D 1/0219; G01C 21/00; G01C 21/36; A01B 90/007
USPC .................................. 701/400, 409, 50, 24, 26
See application file for complete search history.

(56) References Cited

U.S. PATENT DOCUMENTS

| | | |
|---|---|---|
| 5,995,902 A | 11/1999 | Monson |
| 6,076,025 A | 6/2000 | Ueno et al. |
| 6,615,108 B1 | 9/2003 | Peless et al. |
| 6,885,912 B2 | 4/2005 | Peless et al. |
| 6,907,336 B2 | 6/2005 | Gray et al. |
| 7,010,425 B2 | 3/2006 | Gray et al. |
| 7,155,309 B2 | 12/2006 | Peless et al. |
| 7,173,391 B2 | 2/2007 | Jones et al. |
| 7,228,214 B2 | 6/2007 | Flann et al. |
| 7,349,759 B2 | 3/2008 | Peless et al. |
| 7,388,343 B2 | 6/2008 | Jones et al. |
| 7,429,843 B2 | 9/2008 | Jones et al. |
| 7,451,030 B2 | 11/2008 | Eglington et al. |
| 7,502,678 B2 | 3/2009 | Diekhans et al. |
| 7,591,226 B2 | 9/2009 | Dix et al. |
| 7,689,356 B2 | 3/2010 | Dix et al. |
| 7,706,948 B2 | 4/2010 | Dix et al. |
| 7,715,966 B2 | 5/2010 | Dix et al. |
| 7,747,370 B2 | 6/2010 | Dix |
| 7,873,437 B2 | 1/2011 | Aldred et al. |
| 7,877,182 B2 | 1/2011 | Dix et al. |
| 8,060,299 B2 | 11/2011 | Gharsalli et al. |
| 8,204,654 B2 * | 6/2012 | Sachs et al. ..................... 701/50 |
| 2004/0193348 A1 * | 9/2004 | Gray et al. ...................... 701/50 |
| 2010/0262342 A1 * | 10/2010 | Dix et al. ........................ 701/50 |

* cited by examiner

*Primary Examiner* — Tan Q Nguyen
(74) *Attorney, Agent, or Firm* — Rajesh Vallabh; Foley Hoag LLP

(57) ABSTRACT

A computer-implemented method and system for generating a swath coverage pattern for a given working area to be traversed by a vehicle or equipment attached thereto.

22 Claims, 10 Drawing Sheets

US 8,983,767 B2

COMPUTER-IMPLEMENTED METHOD AND SYSTEM FOR GENERATING SWATH COVERAGE PATTERNS FOR POLYGONAL AND PSEUDO-POLYGONAL SHAPED FIELDS

CROSS REFERENCE TO RELATED APPLICATIONS

This application claims priority from U.S. Provisional Patent Application No. 61/605,849 filed on Mar. 2, 2012 entitled COMPUTER-IMPLEMENTED METHOD AND SYSTEM FOR GENERATING SWATH COVERAGE PATTERNS FOR POLYGONAL AND PSEUDO-POLYGONAL SHAPED FIELDS, which is hereby incorporated by reference.

BACKGROUND

The present application generally relates to techniques for generating swath coverage patterns for working areas such as, e.g., agricultural fields, mining or construction work sites, and aircraft runways. More particularly, the application relates to methods and systems for automatically constructing a path for a vehicle such that generally the entirety of a predetermined area is traversed by the vehicle, or alternatively, traversed by equipment attached to the vehicle. The vehicle path is optimized to reduce drive time, and avoid covering portions of the predetermined area more than once.

BRIEF SUMMARY

In accordance with one or more embodiments, a computer-implemented method is provided for generating a swath coverage pattern for a given working area to be traversed by a vehicle or equipment attached thereto. The method comprises steps, each implemented in a computer system, of: (a) designating a covered area denoted by a polygon defined by an ordered set of vertices; and (b) partitioning the covered area into an ordered set of swaths by: (i) defining a headlands swath pattern for providing a continuous turnaround buffer for the vehicle or equipment attached thereto, said headlands swath pattern forming a border around an inner perimeter of the covered area; and (ii) defining a series of parallel swaths to cover an interior portion of the covered area within the headlands swaths, said parallel swaths alternating back and forth across the interior portion of the covered area.

In accordance with one or more further embodiments, a computer system is provided, comprising at least one processor, memory associated with the at least one processor, and a program supported in the memory for generating a swath coverage pattern for a given working area to be traversed by a vehicle or equipment attached thereto. The program has a plurality of instructions stored therein which, when executed by the at least one processor, cause the at least one processor to: (a) designate a covered area denoted by a polygon defined by an ordered set of vertices; and (b) partition the covered area into an ordered set of swaths by: (i) defining a headlands swath pattern for providing a continuous turnaround buffer for the vehicle or equipment attached thereto, said headlands swath pattern forming a border around an inner perimeter of the covered area; and (ii) defining a series of parallel swaths to cover an interior portion of the covered area within the headlands swaths, said parallel swaths alternating back and forth across the interior portion of the covered area.

DETAILED DESCRIPTION

In various exemplary embodiments described herein, the working implement is rigidly driven by a traction (or other) vehicle. However, this is by way of illustration only, and such embodiments are also applicable to cases where the working implement is towed using a non-rigid hitch, either passively or with active steering.

The traction vehicle can be manually controlled or automatically driven. In the manually controlled case, the constructed swaths are presented to a human operator as a guideline. In the automatically driven case, a computerized traction vehicle follows the constructed paths.

Several working area geometries are depicted in the figures. These are by way of example only and various embodiments described herein are applicable to a wide range of polygonal and pseudo-polygonal working areas that have curves and convex and concave corners. This includes rectilinear fields or areas, as well as those with irregular borders.

Some specific embodiments may refer to a path as a piecewise set of points. This is by way of example only, and the system as a whole is equally capable of operating on smooth path representations such as cubic splines or Bezier curves.

As used herein, a "planner" refers to a computer-implemented system for generating swath coverage patterns.

A "swath" refers to a single pass of the working implement over the desired area and can be represented by a curved or straight path and an associated width. A "pass" refers to one or more adjacent "swaths" which are constructed so as to be equivalent to a single swath with greater width. Throughout the course of operations, often implements of differing widths are used. The "swath" versus "path" distinction allows this even in the case of implements with a row crop configuration, where the differing attempts must generally exactly line up.

Some operations require that an intermediate path be "smoothed". In this case, smoothing is any operation that transforms an existing path into one that meets curvature constraints and optionally limits the path to one side or the other of the existing path. This operation is performed in order to render the final swaths drivable by a working implement that may have a non-zero turning radius.

The following illustrates an exemplary process for generating swath coverage patterns in accordance with one or more embodiments.

1. Covered Area Designation

Summary: The area to be covered is surveyed and processed into a machine-readable format.

Figure 1:
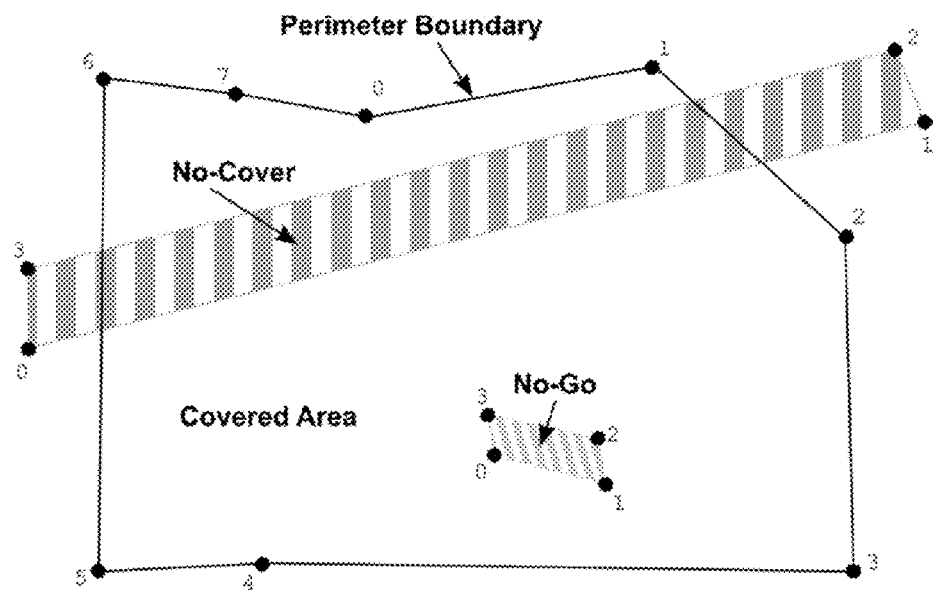
FIG. 1 is a simplified diagram illustrating an exemplary area to be covered by swath coverage patterns.

The system operator performs an electronic survey of the boundary perimeter of the area to be covered. The result of the survey is a polygon denoted by an ordered list of vertices, representing the area to be covered. Within the boundary, exclusion areas not to be covered may also be surveyed. These exclusions may be classified as "travel not permitted (NO-GO)" (aka "obstacles") or "travel permitted, but area coverage not required (NO-COVER)" as shown, e.g., in FIG. 1.

Figure 2:
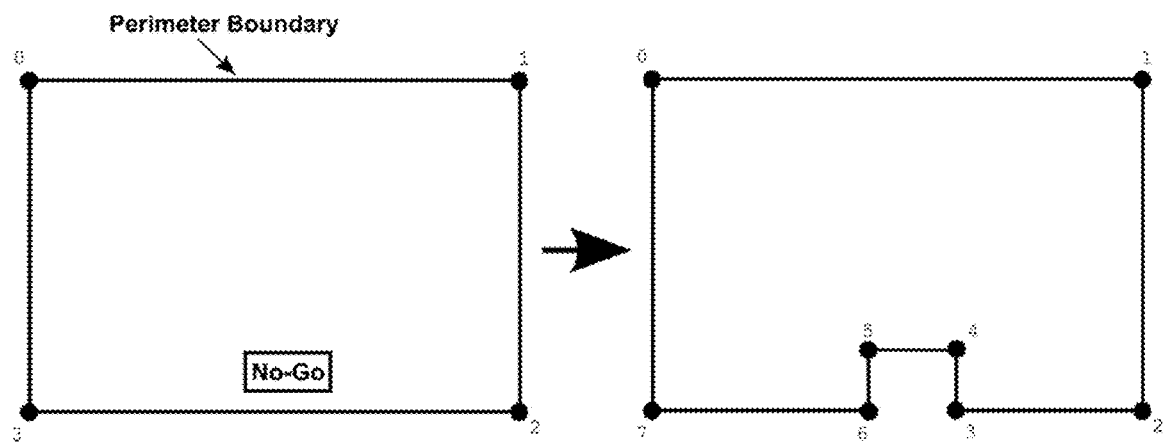
FIG. 2 is a simplified diagram illustrating an exemplary area to be covered including a "no-go" area.

From the perimeter paths, the planner determines the extent of the covered area. If there are NO-GO exclusions near the perimeter that do not allow space for a vehicle to pass between the perimeter and the exclusion, the NO-GO areas are widened and incorporated into the perimeter (thereby reducing the covered area) as shown, e.g., in FIG. 2.

2. Coverage Swath Selection

Summary: The covered area is partitioned into individual swaths that achieve full area coverage that are ordered, directed, smooth, approximately-equidistant, and semi-regular.

Figure 3:
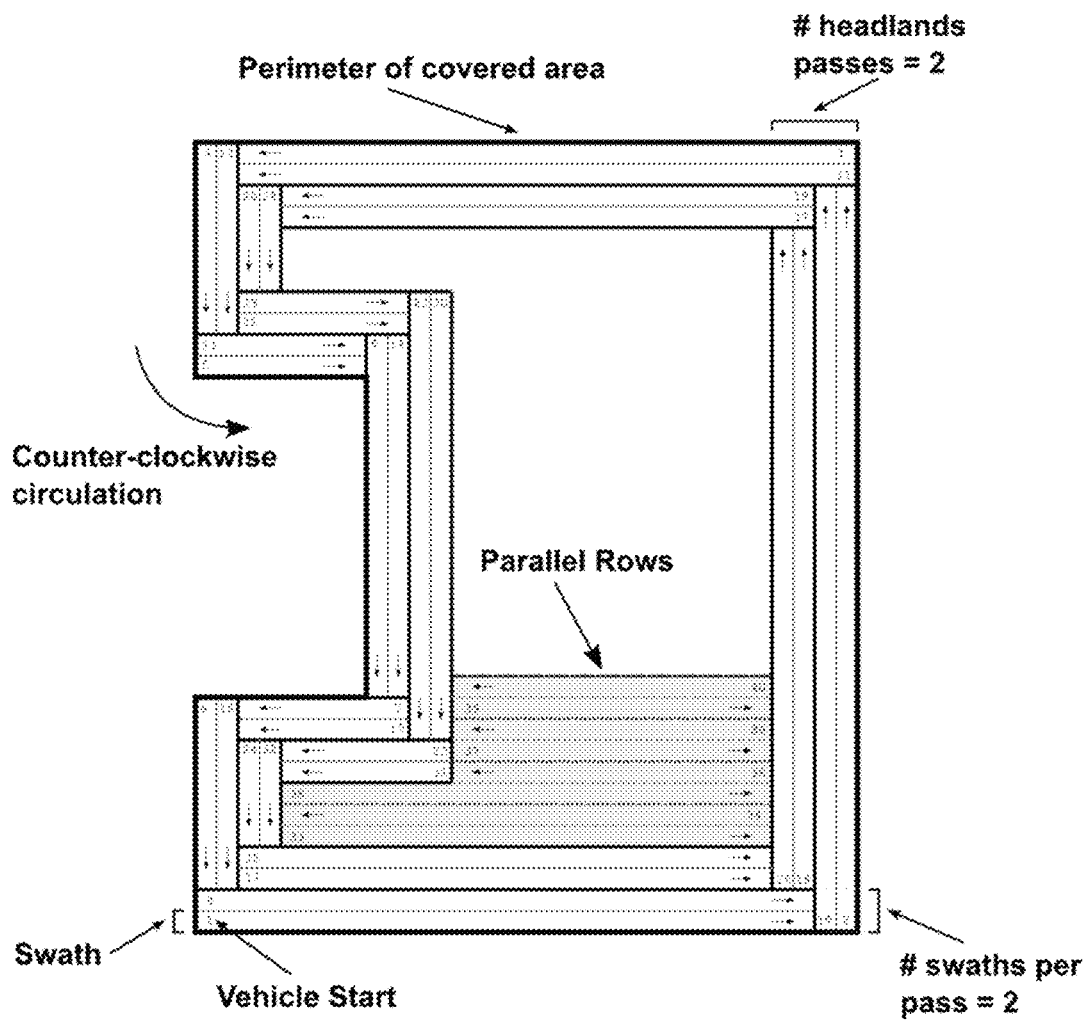
FIG. 3 is a simplified diagram illustrating an exemplary area with a swath coverage pattern.

To reduce drive time, the vehicle path should prefer continuous turns over multi-point turns (where the vehicle has to stop and back up). In a typical case, the survey does not permit driving outside of the covered area, so a headlands pattern (discussed below in section 2.1) is used to form a continuous turn-around buffer, prior to beginning parallel swaths (discussed below in section 2.2) as illustrated by way of example in FIG. 3. If the survey already contains a preexisting turn-around buffer, the headlands step may be omitted.

The parameters that can affect the swath results include (a) approximate starting point for the first swath, (b) number of matched swaths in a pass, (c) clockwise or counter-clockwise circulation, and (d) number of passes around the circulation.

2.1 Headlands

Summary: The border area is partitioned into circulating swaths.

Given the covered area, the planner determines a list of "headlands" swaths that circulate around the interior perimeter of the covered area. The purpose of the headlands is to provide a margin around the edge of the covered area that allows the vehicle to turn between parallel coverage swaths without needing to stop or back up. The swaths should avoid NO-GO areas and obey constraints on their smoothness. As input to this step, the planner is provided with the covered area, number of headlands passes, number of swaths per pass, direction of circulation (clockwise or counter-clockwise), and vehicle start point. (Refer to FIG. 3)

This method creates swaths that immediately abut into arbitrary corners, while simultaneously following gentle contours, maximizing usage of the working area. Working areas need not be convex, and corners may either be convex or concave.

To determine a list of headlands swaths, the planner first creates a "working area perimeter path," generally identical to the outer border of the covered area, and then repeats steps (1)-(4) for the number of headlands passes.

Figure 4:
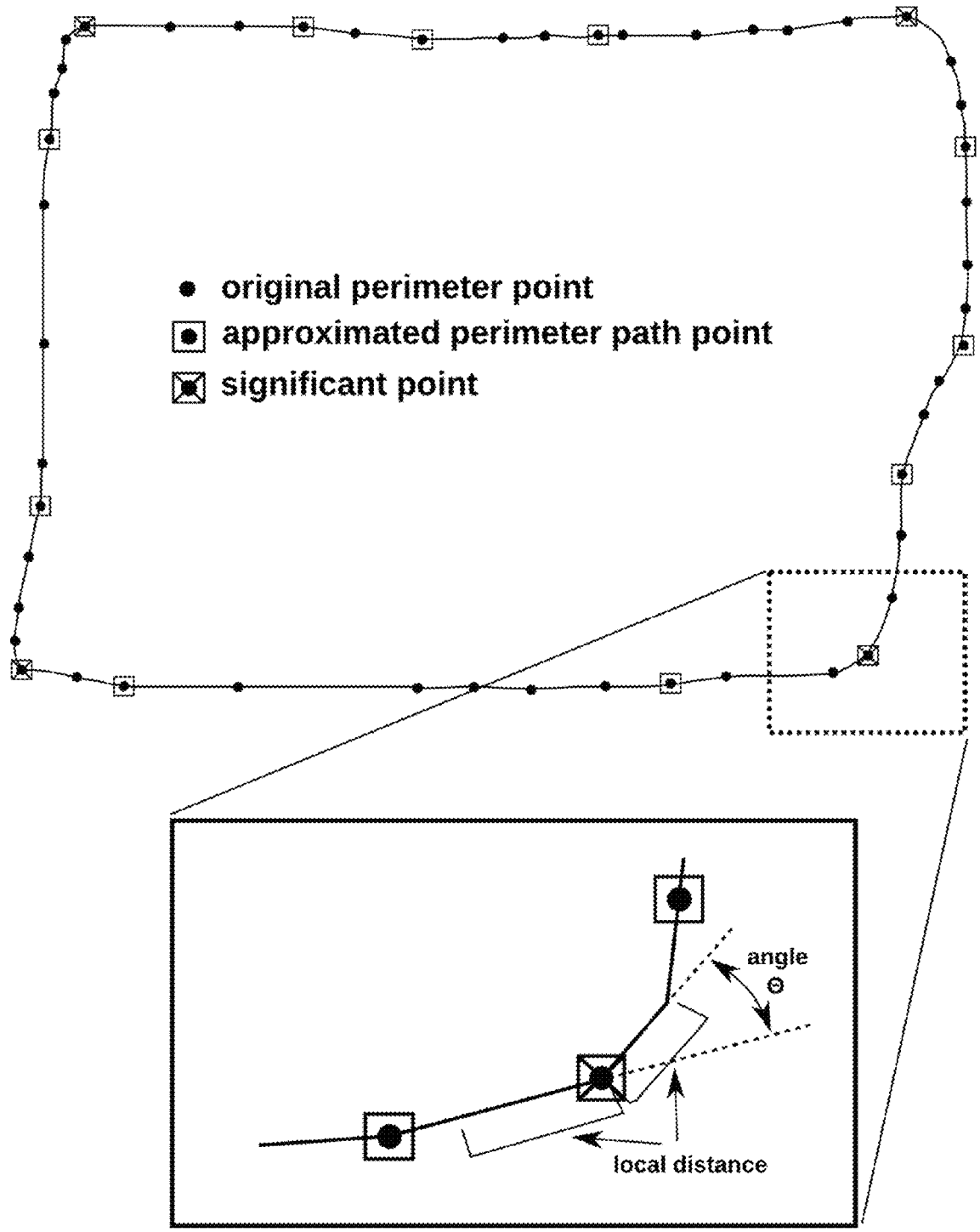
FIG. 4 is a simplified diagram illustrating determination of significant corners of a working area perimeter.

(1) Determine the significant corners of the working area perimeter. (Refer to FIG. 4).

(1)(a) If the working area perimeter's direction of circulation (clockwise or counter-clockwise) does not match the requested direction of headlands circulation, reverse the order of points in the working area perimeter path.

(1)(b) Determine the "approximated working area perimeter path," an approximation of the perimeter path using a polygon approximation that preserves original vertices (i.e., an approximation that solely removes vertices).

(1)(c) Determine the significant corners by choosing from the remaining vertices those whose angle between incoming and outgoing paths over a local distance (angle $\theta$ shown in FIG. 4) exceeds a given threshold. By way of non-limiting example, the threshold is 45 degrees. The initial significant corner is the one closest to the vehicle start point, then followed by other significant corners in the circular order they appear within the approximated working area perimeter path.

(1)(d) If there are two or fewer corners, stop and jump to step (5). Otherwise, continue to step (2).

Figure 5:
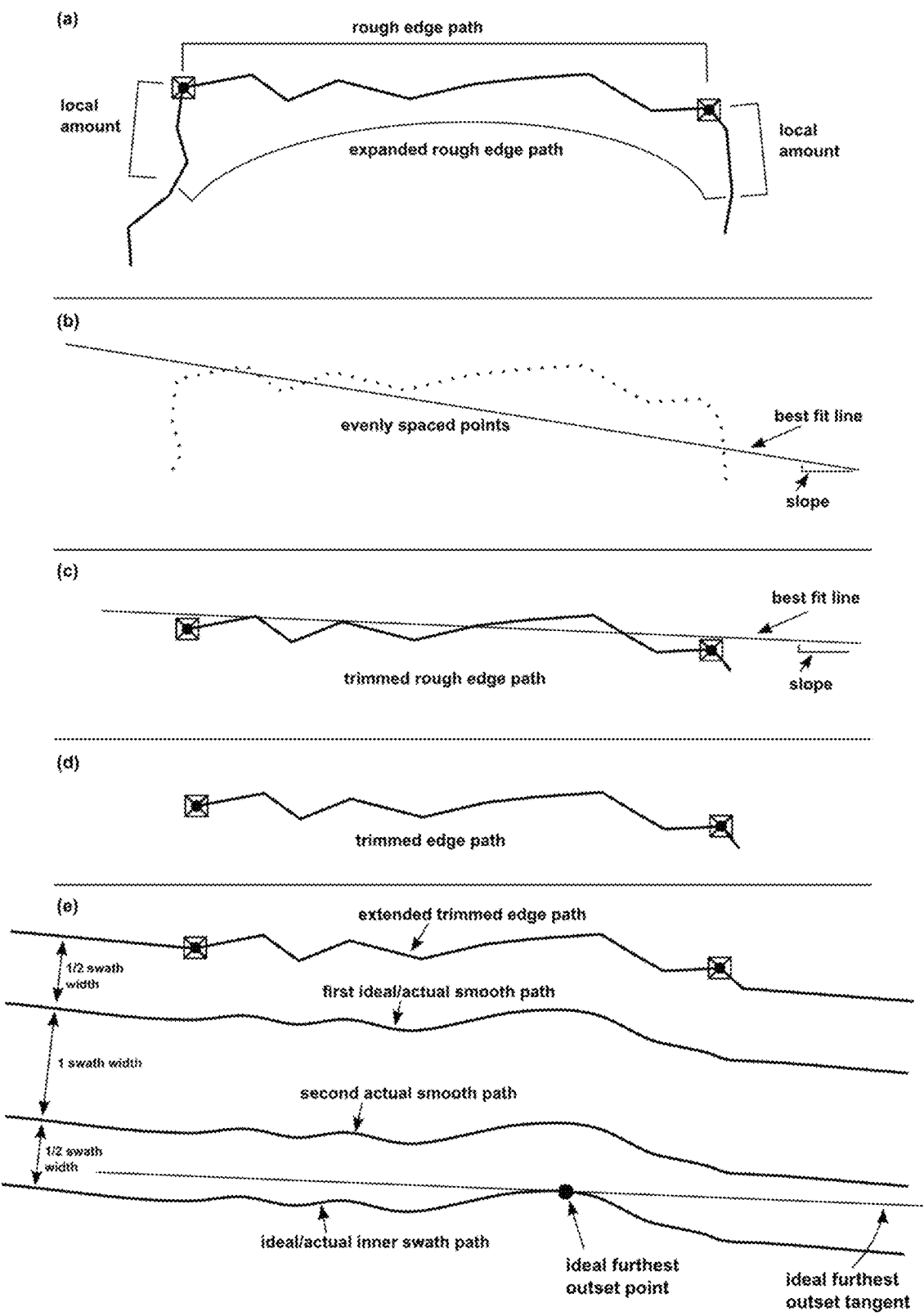
FIGS. 5(a)-5(e) (collectively referred to as FIG. 5) are a series of diagrams illustrating determination of a swath path from an edge of the working area perimeter.

(2) Determine edges formed by significant corners, and the derived geometry of each edge. For each neighboring pair of significant corners, repeat steps (2)(a)-(p) discussed below. (Refer to the example of FIG. 5) Each of the following items defines one aspect of the derived geometry for the edge.

(2)(a) Determine the "rough edge path" formed by the vertices of the working area perimeter path that fall in sequence between the pair of significant corners, including the corner vertices themselves. (as shown in FIG. 5a)

(2)(b) Determine the "expanded rough edge path" by adding onto the rough edge path an additional local amount of the working area perimeter path that abuts the pair of significant corners. (FIG. 5a)

(2)(c) Determine the "trimmed rough edge path slope" by the slope of the best-fit line through a number of evenly-spaced points that lie on the expanded rough edge path. (FIG. 5b)

(2)(d) Determine the "trimmed rough edge path" by repeatedly discarding from the expanded rough edge path all initial or final line segments whose difference in slope from the trimmed rough edge path slope exceeds a threshold. (FIG. 5c)

(2)(e) Determine the "trimmed edge path slope" by the slope of the best-fit line through a number of evenly-spaced points that lie on the trimmed rough edge path. (FIG. 5c)

(2)(f) Determine the "trimmed edge path" by repeatedly discarding from the trimmed rough edge path all initial or final line segments whose difference in slope from the trimmed edge path slope exceeds a threshold. (FIG. 5d)

(2)(g) Determine the "extension length" as the length of the diagonal of the bounding rectangle around the working area perimeter.

(2)(h) Determine the "extended trimmed edge path" by extending the trimmed edge path by the extension length on each end, using a straight line segment in the direction of the trimmed edge path slope. (FIG. 5e)

(2)(i) Determine the "first ideal smooth path" by insetting the extended trimmed edge path by one-half swath width, and then smoothing the path to the inner side (away from the working area perimeter) to be feasibly drivable.

(2)(j) Determine the "first actual smooth path" by deviating and smoothing the first ideal smooth path to bend around any NO-GO areas toward the outer side (toward the working area perimeter).

(2)(k) Determine the "actual smooth paths" by collecting the first actual smooth path, along with additional insets of the first actual smooth path by repeatedly adding one swath width of separation between paths, so that the number of actual smooth paths matches the requested number of swaths per pass.

(2)(l) Determine the "actual inner swath path" by insetting the final actual smooth path by an additional one-half swath width.

(2)(m) Determine the "ideal inner swath path" by insetting the first ideal smooth path by the (number of swaths per pass, less one-half) times the swath width.

(2)(n) Determine the "ideal furthest outset point" as the point on the ideal inner swath path that is the most extremely located along the ray perpendicular to the trimmed edge path slope pointed outside the working area.

(2)(o) Determine the "ideal furthest outset tangent" line formed by the "ideal furthest outset point" and the trimmed edge path slope.

Figure 6:
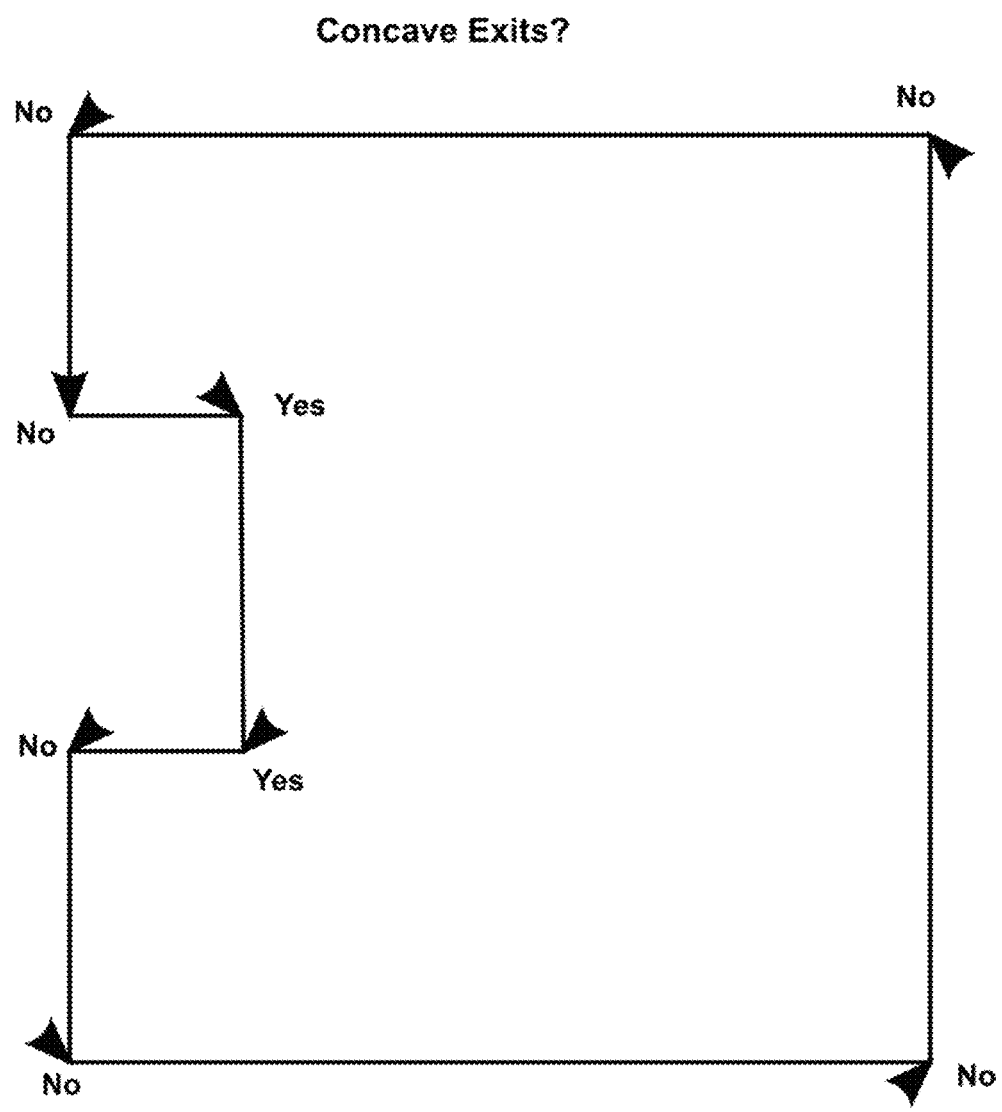
FIG. 6 is a simplified diagram illustrating an exemplary area with concave exits.

(2)(p) Determine whether this edge "exits concave" based upon the change in direction of this edge into the subsequent edge and the requested circulation. (FIG. 6)

Figure 7:
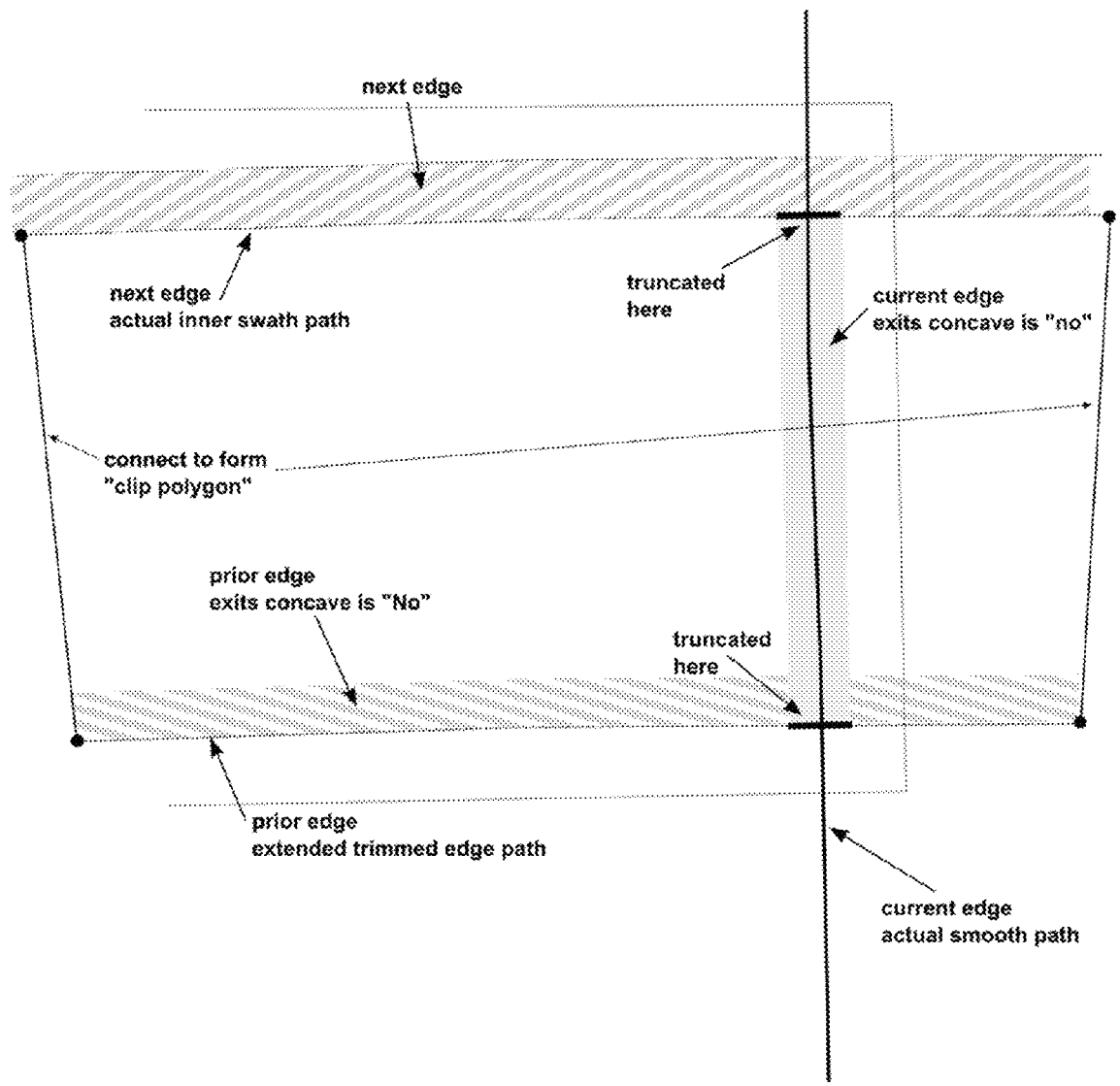
FIG. 7 is a simplified diagram illustrating an exemplary process for determining headlands swaths.

(3) Determine the next list of headlands swaths based on the derived geometry. For each swath within the requested number of swaths per pass, and for each of the edges formed by significant corners in step (2), repeat steps (3)(a)-(f) discussed below. (Refer to FIG. 7)

(3)(a) Identify the "prior", "current", and "next" sets of derived geometry from step (2); the current geometry is taken from the edge that corresponds to the current swath, the prior and next edges are found earlier and later respectively in the list of derived geometry, by the order of the requested direction of headlands circulation.

(3)(b) Determine "prior edge clip path" as either the prior edge derived geometry's (3)(b)(i) actual inner swath path, if the prior edge exits concave, or (3)(b)(ii) extended trimmed edge path, otherwise.

(3)(c) Determine "next edge clip path" as either the next edge derived geometry's (3)(c)(i) extended trimmed edge path, if the current edge exits concave, or (3)(c)(ii) actual inner swath path, otherwise.

(3)(d) Determine the "clip polygon" by connecting the "prior edge clip path" followed by the "next edge clip path" in a loop. If the prior edge exits concave differs from the current edge exits concave, reverse the "next edge clip path" before connection.

(3)(e) Determine the "single headlands swath" as the current edge derived geometry's actual smooth path, truncated to fit within the clip polygon.

(3)(f) Append the single headlands swath to the list of results for this step.

(4) Determine the working area perimeter path for the next iteration.

(4)(a) If this was the final headlands pass, there will be no further iteration, so move on directly to step (5). Otherwise, continue to the next item (4)(b).

(4)(b) Determine the polygon formed by the list of vertices that are formed by intersecting the adjacent "ideal furthest outset tangent" segments.

(4)(c) Determine the next iteration's working area by discarding area outside of (4)(b)'s polygon from the current iteration's working area.

(4)(d) Determine the next iteration's working area perimeter path as the perimeter path of (4)(c)'s working area.

(4)(e) Return to step (1) for the next headlands pass.

(5) Determine the remaining uncovered area.

(5)(a) Determine the perimeter path of the remaining uncovered area by connecting the innermost swath edges on the innermost grouping of headlands swaths from the final headlands pass, in order.

(5)(b) Determine the remaining uncovered area by taking the area within the central enclosed region of (4)(a)'s perimeter path.

(6) Determine the corresponding potential master swaths for the remaining uncovered area.

(6)(a) For each swath in the innermost ring of headlands swaths from step (3), inset the swath by one half swath width.

The remaining area from step (5) is carried forward as the input to the next section (2.2), and will be covered by parallel swaths. The potential master swaths from step (6) are presented to the user, who will select one to be used as the input to the next section (2.2).

2.2 Parallel Swaths

Summary: Remaining area is partitioned into alternating parallel swaths.

Figure 8:
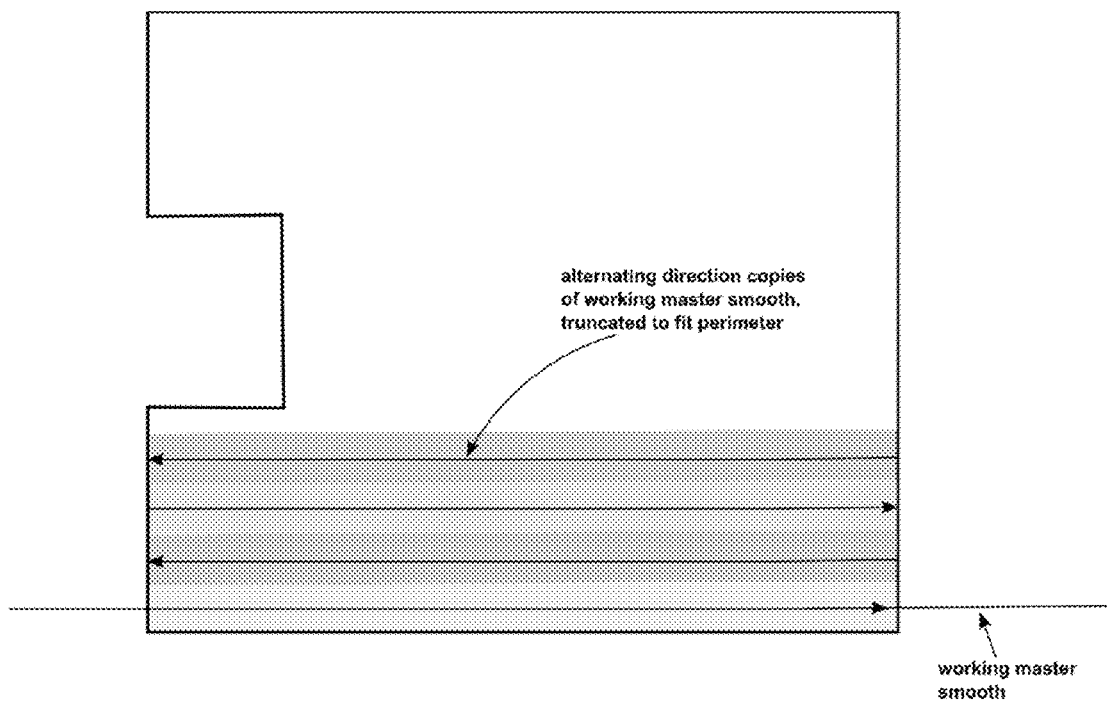
FIG. 8 is a simplified diagram illustrating an exemplary process for determining parallel swaths.

The planner determines equidistant parallel swaths that cover the remaining area, accounting for obstacles and swath pairing. The first "master" swath is provided as input. The additional swaths will alternate back and forth across the remaining area, with subsequent swaths equidistantly spaced, progressing from the master swath towards the center of the area, continuing until no area remains to be covered. (Refer to FIG. 8)

The planner uses the remaining area's bounding rectangle's center to determine whether the first generated swath is on the "left" or "right" side of the master swath. (The master swath will typically abut one edge of the remaining area.)

Next, the planner creates a "working master" swath by extending the master swath on either end by a length greater than any chord in the remaining area. This is to ensure that the working master always starts and ends outside of the remaining area, even after later adjustments.

Next, the planner bi-directionally smoothes the working master swath to limit the path's curvature to one that is drivable by the vehicle.

Next, the planner asks the obstacle-avoidance-planner to route the working master swath around any obstacles that it crosses. If a crossing is found, both "avoid-left" and "avoid-right" variants of the swath are produced by the obstacle-avoidance-planner: the shorter of the two swaths is used as the "template" swath, the longer of the two swaths is held aside for later use. If no crossing is found, the working master swath is used as the template swath.

Next, the planner generates matched swaths based on the template swath: copies are spaced equidistantly apart by the swath width and then truncated to end upon exiting the remaining area.

When obstacle-avoidance is complete (specifically: when a given working master swath does not cross an obstacle, but the immediately prior working master swath did cross an obstacle), the longer of the avoiding swaths that were held aside earlier are now assessed as possible new template swaths. If matched swaths generated from the held-aside template swaths add meaningful amount of new coverage (as determined by a heuristic), they are inserted into the list of additional swaths between obstacle-crossing and the obstacle-free swaths.

Next, to continue filling the remaining area, the working master swath is updated by making a copy an equidistant amount away and bi-directionally smoothing it.

The "parallel" swaths that result from this step in created alternating directions, e.g., the first swath is pointed easterly, the second westerly, the third easterly, etc., so that the endpoints of neighboring swaths are located nearby.

3. Partial Implement Control

Summary: The individual swaths are refined to avoid double coverage and reduce drive time.

Figure 9:
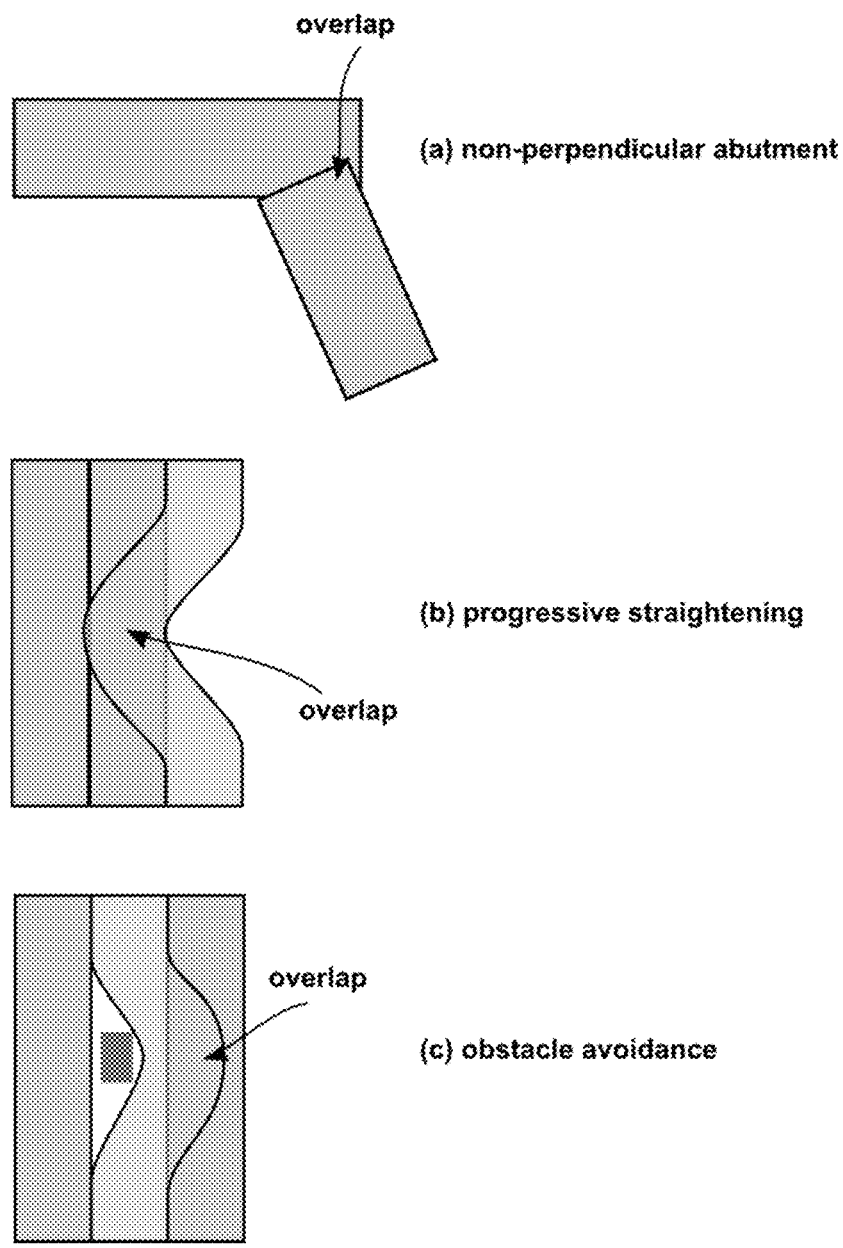
FIGS. 9(a)-9(c) (collectively referred to as FIG. 9) are simplified diagrams illustrating swath overlapping.

The geometry of the coverage swaths may leave portions of their swaths overlapping, due to either (a) non-perpendicular abutment, (b) progressive straightening, or (c) obstacle avoidance. The planner can annotate the swaths to progressively enable an implement as subsequent swaths overlap prior swaths. If the implement is entirely disabled for a period of time, the swath can be broken down into separate pieces, so that the implement can be raised and lowered (and speed increased). If this occurs at the start of end of a swath, the unnecessary prefix or suffix of the swath can be removed. (Refer to FIG. 9)

4. Trajectory Planning

Summary: The individual coverage swaths are converted into safe, individual vehicle trajectories.

Figure 10:
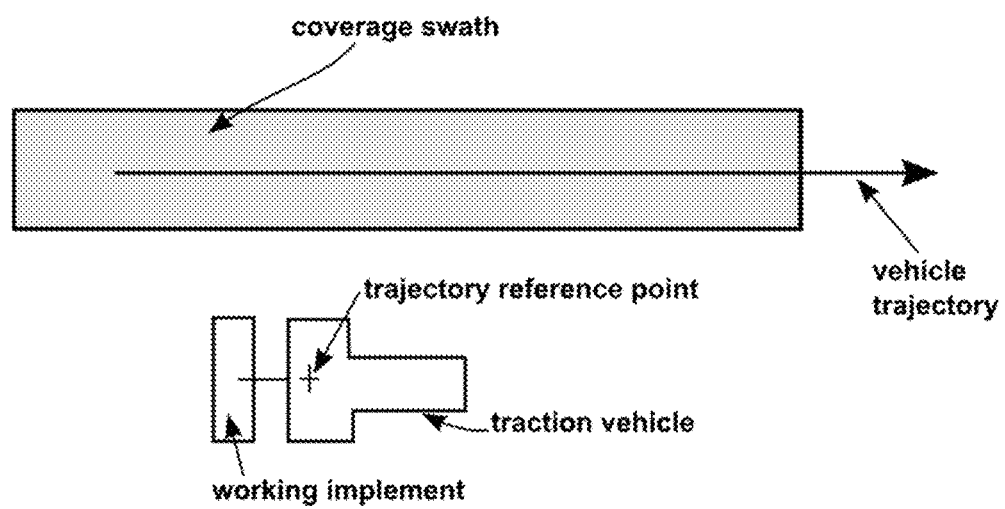
FIG. 10 is a simplified diagram illustrating trajectory planning.

The planner converts each coverage swath into a vehicle trajectory that accomplishes coverage of the swath. For example, if equipment attached to the rear of the vehicle is what achieves coverage, the vehicle trajectory will begin after the start of the swath (to align the equipment with the start of the swath), and continue past the end. (Refer to FIG. 10)

The planner adjusts the vehicle trajectories to remain safe to drive. For both the start and end of each trajectory, the planner trims off just enough of the path so that the vehicle will remain within the allowed safety areas.

5. Joining Trajectories

Summary: The individual vehicle trajectories are connected together by inserting (possibly multi-point) turns between them.

Once the individual vehicle trajectory for each swath is known, the individual trajectories are connected together to form a single long trajectory. It may not be possible to simply drive directly from the end of one trajectory to the start of another, due to limited areas of safe travel. For instance, an irregular boundary may intrude upon a headlands region. Instead, a sequence backing up and pulling forward again may be required (known as 3-point or 4-point turns).

The method of entry or exit from an individual vehicle trajectory may need to follow certain constraints. For example, the approach direction into a trajectory needs to be aligned with the initial direction of the trajectory. If the quality of the vehicle's trajectory-following is lesser while turning, a straight-line path of some distance leading into the new trajectory may be required. If there is not enough room for a lead in, the vehicle may need to back up into the start of the trajectory. The attachment equipment may also introduce constraints: for example, a planting unit towed by a tractor may take several seconds to lower to the ground before entering the trajectory, and while lowering the vehicle may not be allowed to turn.

Given the above kinds of constraints, to create a single long trajectory the planner operates as follows. For each individual trajectory to be joined, the planner computes a set of options for how to enter and leave the trajectory. Then the planner searches through the sets of options and chooses the optimal valid choices for connecting together one choice from each set.

Figure 11:
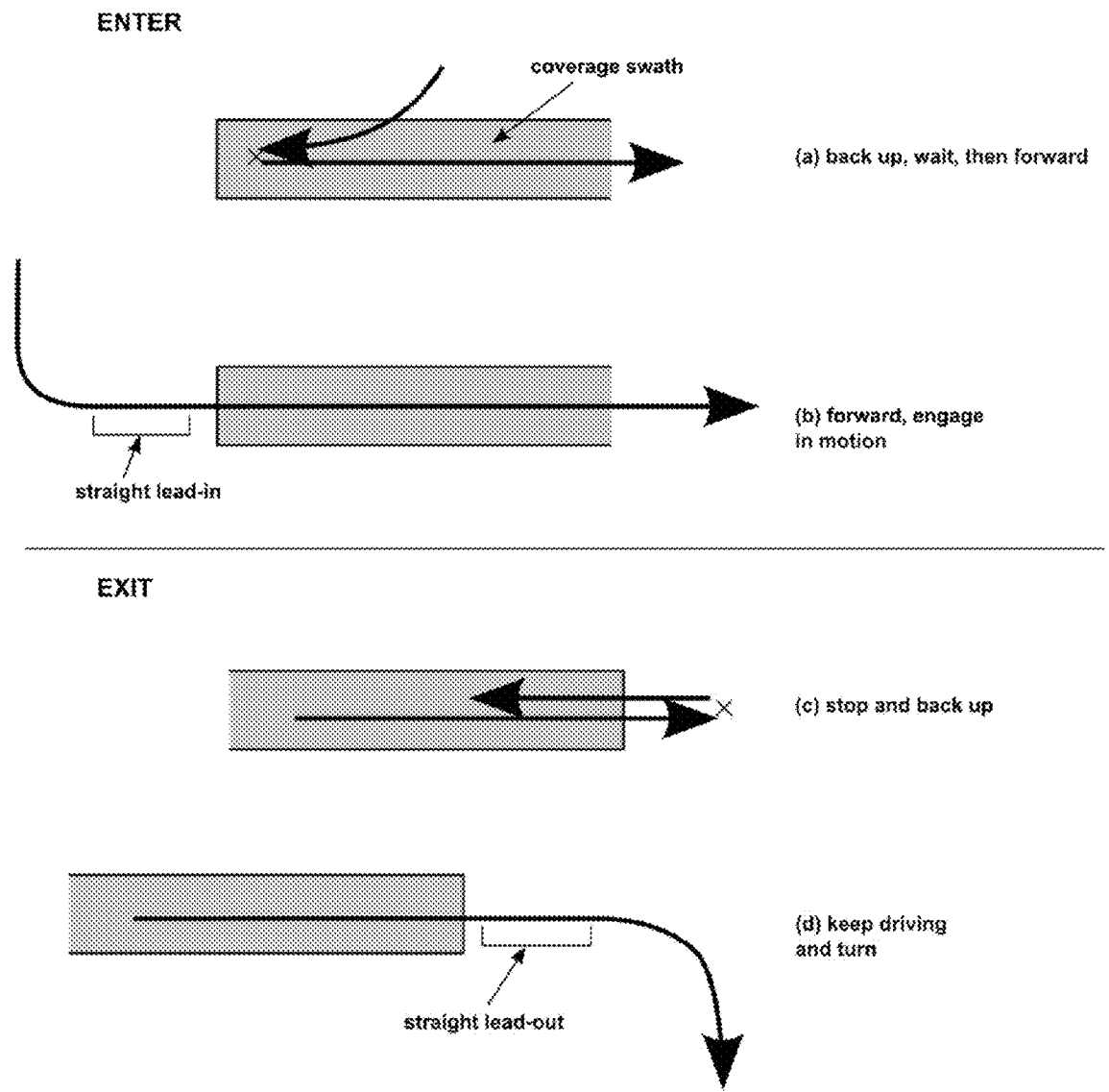
FIGS. 11(a)-11(d) (collectively referred to as FIG. 11) are simplified diagrams possible ways of entering or exiting a trajectory.

As an example, for a planting application, the planner computes a set of connection options as follows. For entering a trajectory, the vehicle can either (a) begin from a stop at the exact beginning of the trajectory with the attached planter equipment lowered into the ground, pointing in the direction of travel that begins the trajectory, or (b) drive in a straight line that approaches in the direction of travel that begins the trajectory, lowering the hitch while moving, where the straight line is long enough to guarantee that the hitch is lowered before planting needs to begin. For exiting a trajectory, the vehicle can either (c) slow to a stop at the exact end of the trajectory with the attached planter equipment still lowered into the ground, or (d) exit in a straight line that continues in the direction of travel that ends the trajectory, raising the hitch while moving, where the straight line is long enough to guarantee that the hitch is fully out of the ground before the vehicle begins turning. Taking all variants, there are at most four options (ac, ad, bc, bd) for each individual trajectory, though not all of them may be permitted in a given circumstance. (Refer to FIG. 11)

To connect two specific options, the planner uses the most efficient choice that is permitted: the first choices is a Dubins curve (direct driving from one to the next without stopping); the second choice is a three-point turn (drive out the end of the first trajectory to stop partway along the second trajectory, stop, then back up to a stop that begins the second trajectory); the third and final choice is a four-point turn (stop at the end of the first trajectory, back up, drive and stop partway along the second trajectory, stop, then back up to a stop that begins the second trajectory). For the three- and four-point turns, the backing up stages are not straight lines but instead trace the contours of the existing trajectories; staying on the existing paths is more likely to ensure a safe a drivable route.

To make the optimal selections across the entire range of trajectory entering/leaving options and connection options, the planner uses a greedy algorithm. The planner assumes that the individual trajectories are long enough that the choices made at the start and the end are independent. Therefore, the planner searches over the space of possible connections between each sequential trajectory pair (as the interior of each trajectory does not matter).

The processes of the planner described above may be implemented in software, hardware, firmware, or any combination thereof. The processes are preferably implemented in one or more computer programs executing on a programmable computer system including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. A computer-implemented method for generating a swath coverage pattern for a given working area to be traversed by a vehicle or equipment attached thereto, the method comprising steps, each implemented in a computer system, of:

(a) designating a covered area denoted by a polygon defined by an ordered set of vertices; and
(b) partitioning the covered area into an ordered set of swaths by:
   (i) defining a headlands swath pattern for providing a continuous turnaround buffer for the vehicle or equipment attached thereto, said headlands swath pattern forming a border around an inner perimeter of the covered area; and
   (ii) defining a series of parallel swaths to cover an interior portion of the covered area within the headlands swaths, said parallel swaths alternating back and forth across the interior portion of the covered area.

2. The method of claim 1, wherein step (b)(i) comprises determining significant corners formed by a perimeter of the covered area, said significant corners having vertices forming an angle between incoming and outgoing paths over a local distance exceeding a given threshold value, and determining edges of the inner perimeter between the significant corners.

3. The method of claim 2, further comprising determining a first smoothed path defining a headlands swath inset from the edges of the perimeter by one-half swath width, said first smoothed path configured to be drivable by the vehicle.

4. The method of claim 3, further comprising determining one or more additional smoothed paths defining a set of swaths for a pass, said one or more additional smoothed paths inset by one swath width from a preceding smoothed path.

5. The method of claim 1, further comprising determining the number of swaths needed for each pass around the inner perimeter.

6. The method of claim 1, further comprising determining a new perimeter path of the remaining covered area for use in determining a next headlands pass.

7. The method of claim 1, further comprising determining an initial working master swath from which the series of parallel swaths progress to alternate back and forth across the interior portion of the covered area.

8. The method of claim 7, further comprising routing the working master swath around any obstacles.

9. The method of claim 1, further comprising specifying a safe-to-drive vehicle trajectory in each swath to cause driven machinery to cover the swath.

10. The method of claim 9, further comprising joining individual trajectories together to create a single connected trajectory.

11. The method of claim 1, further comprising refining the headlands swaths and the parallel swaths to avoid double coverage by annotating them to progressively enable or disable driven machinery.

12. A computer system, comprising:
   at least one processor;
   memory associated with the at least one processor; and
   a program supported in the memory for generating a swath coverage pattern for a given working area to be traversed by a vehicle or equipment attached thereto, the program having a plurality of instructions stored therein which, when executed by the at least one processor, cause the at least one processor to:
   (a) designate a covered area denoted by a polygon defined by an ordered set of vertices; and
   (b) partition the covered area into an ordered set of swaths by:
      (i) defining a headlands swath pattern for providing a continuous turnaround buffer for the vehicle or equipment attached thereto, said headlands swath pattern forming a border around an inner perimeter of the covered area; and
      (ii) defining a series of parallel swaths to cover an interior portion of the covered area within the headlands swaths, said parallel swaths alternating back and forth across the interior portion of the covered area.

13. The system of claim 12, wherein (b)(i) comprises determining significant corners formed by a perimeter of the covered area, said significant corners having vertices forming an angle between incoming and outgoing paths over a local distance exceeding a given threshold value, and determine edges of the inner perimeter between the significant corners.

14. The system of claim 13, wherein the program further comprises instructions which, when executed by the at least one processor, cause the at least one processor to determine a first smoothed path defining a headlands swath inset from the edges of the perimeter by one-half swath width, said first smoothed path configured to be drivable by the vehicle.

15. The system of claim 14, wherein the program further comprises instructions which, when executed by the at least one processor, cause the at least one processor to determine one or more additional smoothed paths defining a set of swaths for a pass, said one or more additional smoothed paths inset by one swath width from a preceding smoothed path.

16. The system of claim 12, wherein the program further comprises instructions which, when executed by the at least one processor, cause the at least one processor to determine the number of swaths needed for each pass around the inner perimeter.

17. The system of claim 12, wherein the program further comprises instructions which, when executed by the at least one processor, cause the at least one processor to determine a new perimeter path of the remaining covered area for use in determining a next headlands pass.

18. The system of claim 12, wherein the program further comprises instructions which, when executed by the at least one processor, cause the at least one processor to determine an initial working master swath from which the series of parallel swaths progress to alternate back and forth across the interior portion of the covered area.

19. The system of claim 18, wherein the program further comprises instructions which, when executed by the at least one processor, cause the at least one processor to route the working master swath around any obstacles.

20. The system of claim 12, wherein the program further comprises instructions which, when executed by the at least one processor, cause the at least one processor to specify a safe-to-drive vehicle trajectory in each swath to cause driven machinery to cover the swath.

21. The system of claim 20, wherein the program further comprises instructions which, when executed by the at least one processor, cause the at least one processor to join individual trajectories together to create a single connected trajectory.

22. The system of claim 12, wherein the program further comprises instructions which, when executed by the at least one processor, cause the at least one processor to refine the headlands swaths and the parallel swaths to avoid double coverage by annotating them to progressively enable or disable driven machinery.

* * * * *